United States Patent
Schimmoller et al.

[11] Patent Number: 6,089,599
[45] Date of Patent: Jul. 18, 2000

[54] BAFFLED AIR BAG

[75] Inventors: Nathan Alan Schimmoller, Clawson; Chetan Mehta, Sterling Heights, both of Mich.

[73] Assignee: Breed Automotive Technology, Inc., Lakeland, Fla.

[21] Appl. No.: 09/150,886

[22] Filed: Sep. 10, 1998

[51] Int. Cl.[7] .................................................. B60R 21/26
[52] U.S. Cl. ...................................... 280/740; 280/743.1
[58] Field of Search ..................................... 280/740, 742, 280/732, 743.1, 741, 736, 743.2, 729

[56] References Cited

U.S. PATENT DOCUMENTS

| | | | |
|---|---|---|---|
| 3,473,824 | 10/1969 | Carey et al. | 280/729 |
| 3,768,830 | 10/1973 | Hass | 280/729 |
| 3,900,210 | 8/1975 | Lohr et al. | 280/729 |
| 5,494,314 | 2/1996 | Kriska et al. | 280/740 |
| 5,503,429 | 4/1996 | Wallner et al. | 280/743.1 |
| 5,845,935 | 12/1998 | Enders et al. | 280/743.2 |
| 5,848,805 | 12/1998 | Sogi et al. | 280/743.2 |
| 5,860,672 | 1/1999 | Petersen | 280/728.2 |
| 5,873,598 | 2/1999 | Yoshioka et al. | 280/740 |
| 5,899,490 | 5/1999 | Wipasuramonton et al. | 280/730.2 |
| 5,913,535 | 6/1999 | Taguchi et al. | 280/729 |
| 5,941,559 | 8/1999 | Rudolf et al. | 280/729 |

*Primary Examiner*—Lanna Mai
*Assistant Examiner*—Lynda Jasmin
*Attorney, Agent, or Firm*—Markell Seitzman

[57] ABSTRACT

An air bag (20) comprising: an inflatable cushion (22) portion and in inlet portion (24) through which inflation gas is received, and an airflow baffle (30; 30a) which creates a low pressure pocket directly downstream of itself and causes the air bag to initially begin to inflate laterally. The baffle includes a flexible panel within the cushion portion downstream of the inlet portion, for diverting at least a portion of the inflation gas to between an edge of the baffle and an adjacent inner surface of the cushion.

12 Claims, 6 Drawing Sheets

BAFFLED AIR BAG

BACKGROUND AND SUMMARY OF THE INVENTION

The invention generally relates to an air bag and more particularly one which initially inflates laterally relative to the occupant to be protected so as to reduce the initial forward velocity of the inflating bag.

The purpose of an air bag is to protect an occupant, typically of an automotive vehicle. As is known in the art, an air bag can be located virtually on any part of the vehicle. Air bags which protect the driver are typically located within the steering wheel. Air bags which protect the passenger are often located in the instrument panel or in the rear of the front seat. Air bags which protect an occupant during a side impact collision or rollover event may be located within a side door panel or within a side wing of the vehicle seat.

The trajectory taken by an inflating air bag and its speed of inflation in relation to the occupant to be protected are relatively important. Air bags are maintained in a compact, folded orientation prior to inflation and then accelerated toward the occupant in response to inflation gas generated by an inflator. In certain situations, the partially inflated air bag is propelled outwardly too close to the occupant and too quickly from its stored location thereby causing abrasion and perhaps injury to the occupant. These injuries are precipitated if the occupant is seated in an out-of-position (OOP) orientation, that is, typically tilted toward the mounting location of the air bag. One method of controlling the trajectory of an air bag is to incorporate therein various panels of material that act as tethers which limit the extent to which the air bag can be propelled toward the occupant. The benefit of a tether is seen in relationship to a partially inflated air bag since the bag is capable of excessive forward motion. As the air bag is fully inflated its forward extension is reduced and the need for the tether lessened.

It is an object of the present invention to provide an improved air bag in which inflation gas is introduced therein in a manner which encourages the air bag to initially inflate laterally, thereby eliminating the need for a tether and which reduces the rate of cushion excursion toward the occupant.

Accordingly the invention comprises: an air bag comprising: an inflatable cushion portion and an inlet portion through which inflation gas is received, and an airflow baffle means for causing the air bag to initially begin to inflate laterally. The baffle comprises a sheet of material which deflects the inflation gas flow sideways toward the sides of the air bag. The baffle may include opening(s) therein which permit a determinable amount of inflation gas to flow directly across the baffle (in a direction toward the occupant) and may also include a tearable line of perforations permitting the baffle to tear in response to a determinable pressure differential thereacross to create an unimpeded flow path for the inflation gas after it opens.

Many other objects and purposes of the invention will be clear from the following detailed description of the drawings.

DETAILED DESCRIPTION OF THE DRAWINGS

Figure 1:
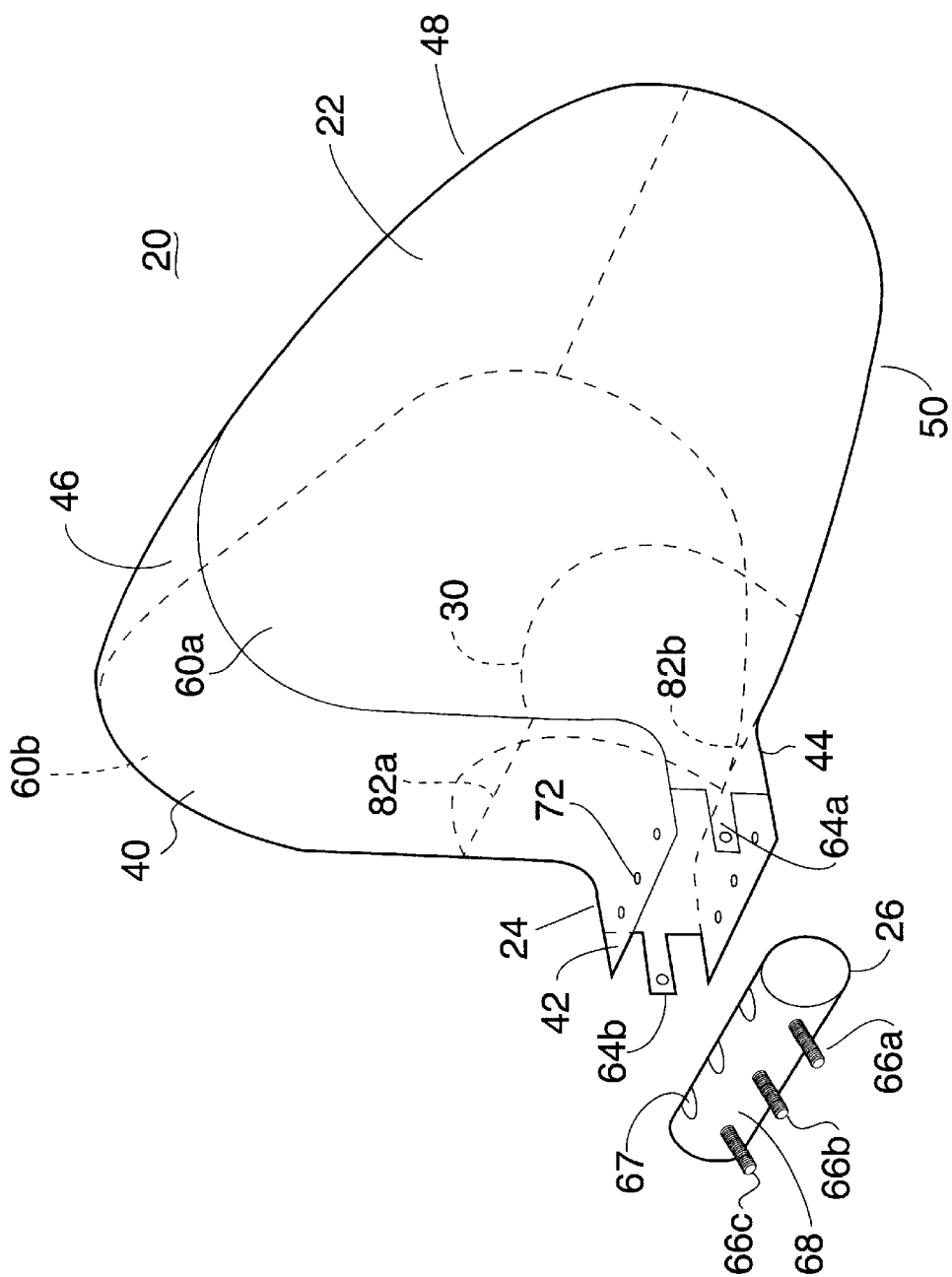
FIG. 1 generally illustrates an inflated air bag which includes the present invention.

The figures show an air bag 20 which comprises an inflatable cushion 22 with an inlet or neck portion 24 through which inflation gas is received. The air bag is inflated by an inflator 26 which may be positioned adjacent or within the air bag 20 or positioned remote thereto. In such a remote configuration, the inflation gas is ported or routed from the inflator to the inlet 24 of the air bag 20 via a manifold or pipe. The air bag 20 further includes a baffle 30 which as described below encourages the air bag to initially inflate laterally thereby reducing the extent and excursion rate to which the air bag moves toward the occupant 32 to be protected. The exemplary air bag 20 includes a main panel 40 which defines a first flap 42 and a second flap 44. The main panel extends from the flap 42 over the top portion 46 of the bag, and also defines a forward face 48 and a bottom 50 of the air bag. The sides of the air bag 20 or cushion are configured by separate side panels 60a and 60b that are sewn to the main panel along seams in a known manner. Each of the side panels proximate the neck 24 includes a narrow tab such as 64a and 64b. The inflator 26 may include a plurality of mounting studs 66a–66c which extend from the body 68 of the inflator. Alternatively, and as is known in the art, the inflator may be received within a hollow holding member or manifold which itself includes the mounting studs 66a–66c. The inflator includes one or more exit ports 67 (if a manifold were used the manifold would also include gas ports as well). The inflator is inserted within the neck 24 and the various flaps 42, 44, 64a and b folded over to receive the various mounting studs 66a–66c. As can be seen from FIG. 1, the various flaps contain one or more openings such as 72 through which is inserted a corresponding mounting fastener 66a, 66b and/or 66c.

In the context of the present invention, the method of fabricating and the materials used to construct the cushion and inlet are immaterial. The air bag may be made of woven material which may be coated or uncoated. Alternatively, the cushion and inlet may be made from one piece of material or one or more panels of material as illustrated. In addition, the cushion and inlet may be made from a plastic film.

As mentioned above, one of the objects of the present invention is to encourage the air bag to initially inflate laterally from its stored or folded position. While not mentioned above, prior to inflation, the cushion 22 is folded or rolled into a compact configuration and positioned adjacent the inflator 26 (which is located within the neck 24). The folded air bag 20 may be stored within a housing or other container and covered by a protective cover or deployment door, as is known in the art. Upon inflation of the air bag, the air bag unfolds (or unrolls) to the inflated configuration shown in FIGS. 1 and 2 and in doing so, forces open the deployment door or cover or other covering material.

Figure 2:
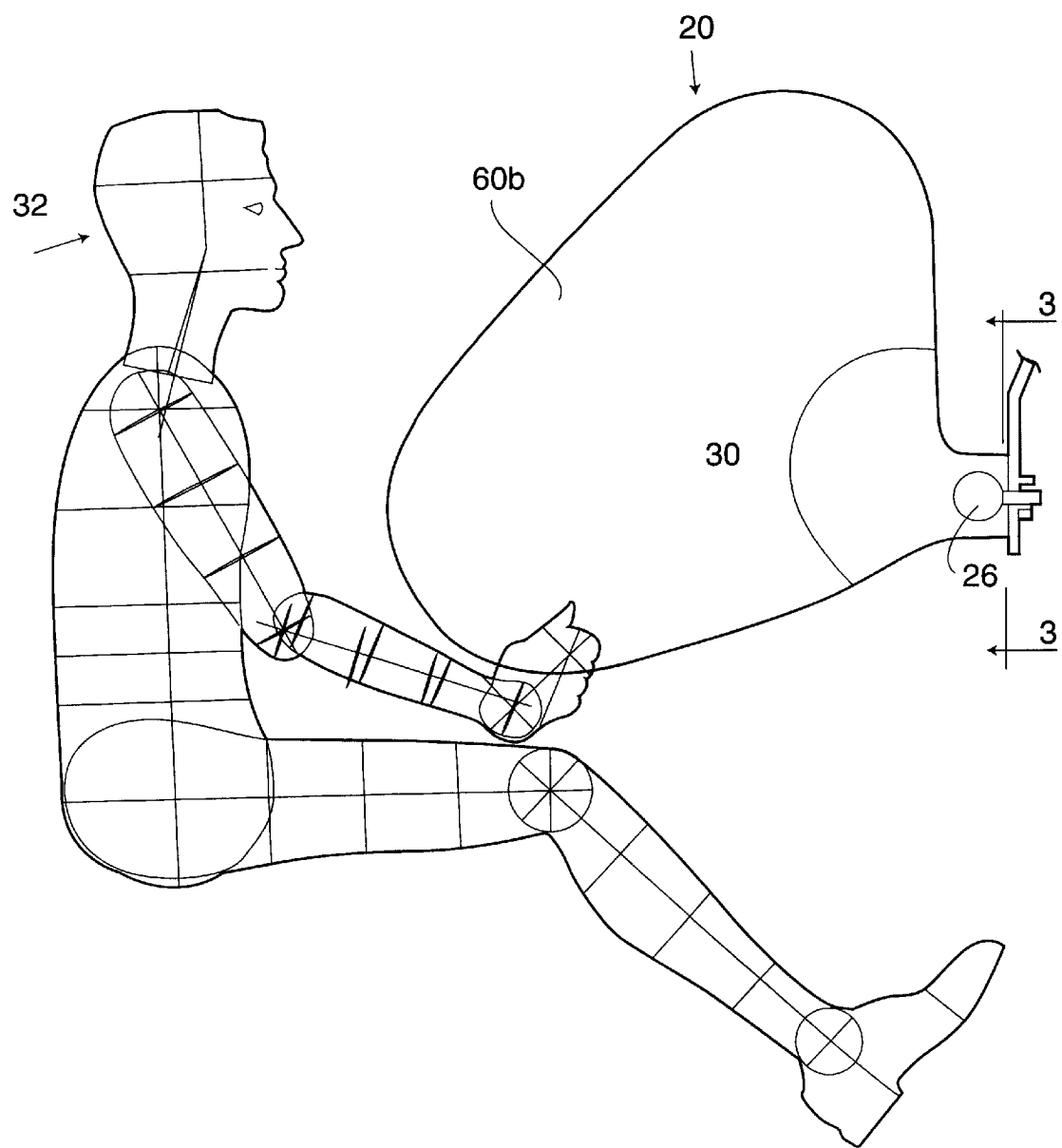
FIG. 2 shows a cross sectional view of an air bag.
Figure 3:
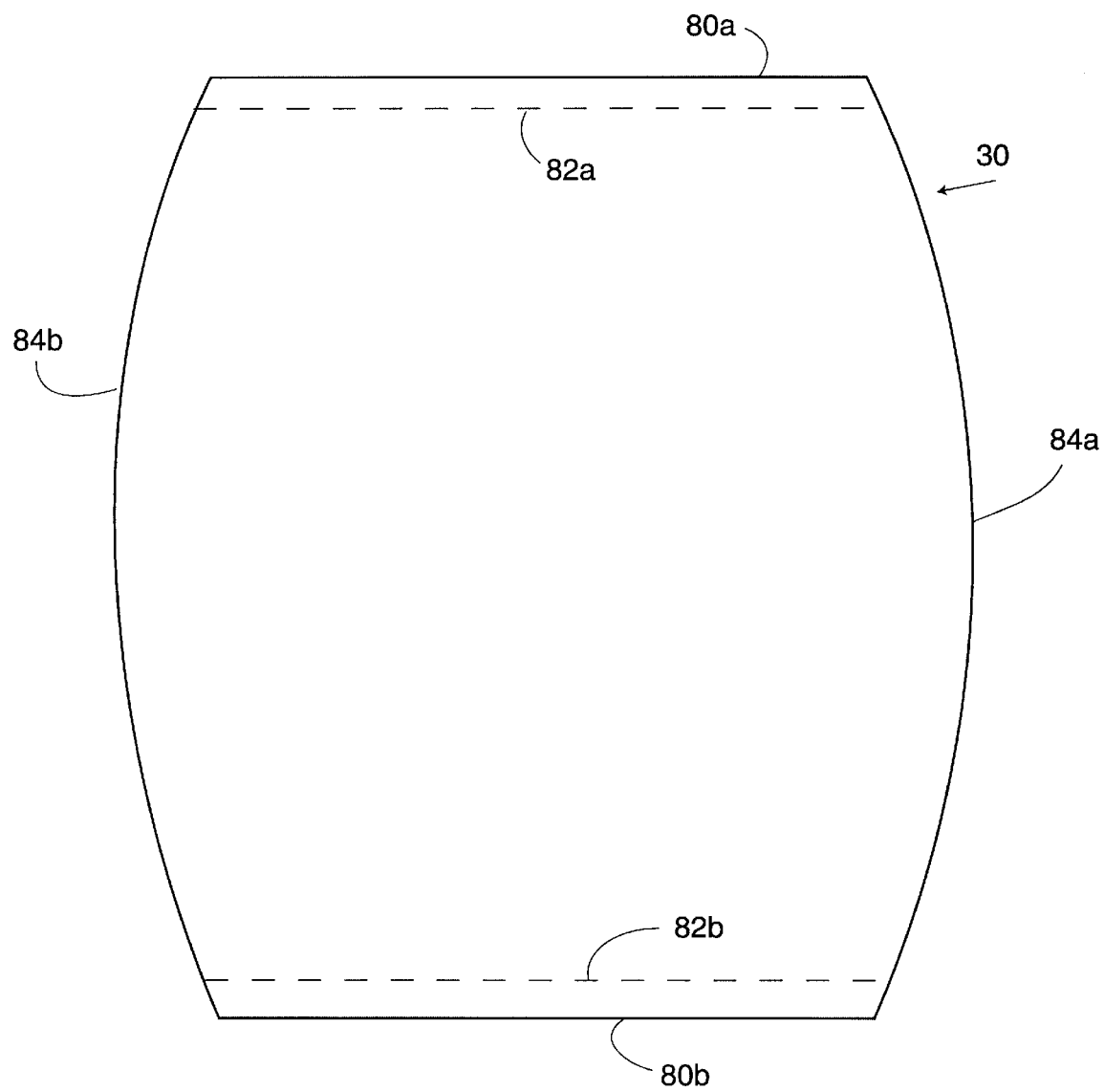
FIG. 3 illustrates a baffle that may be used in the present invention.
Figure 4:
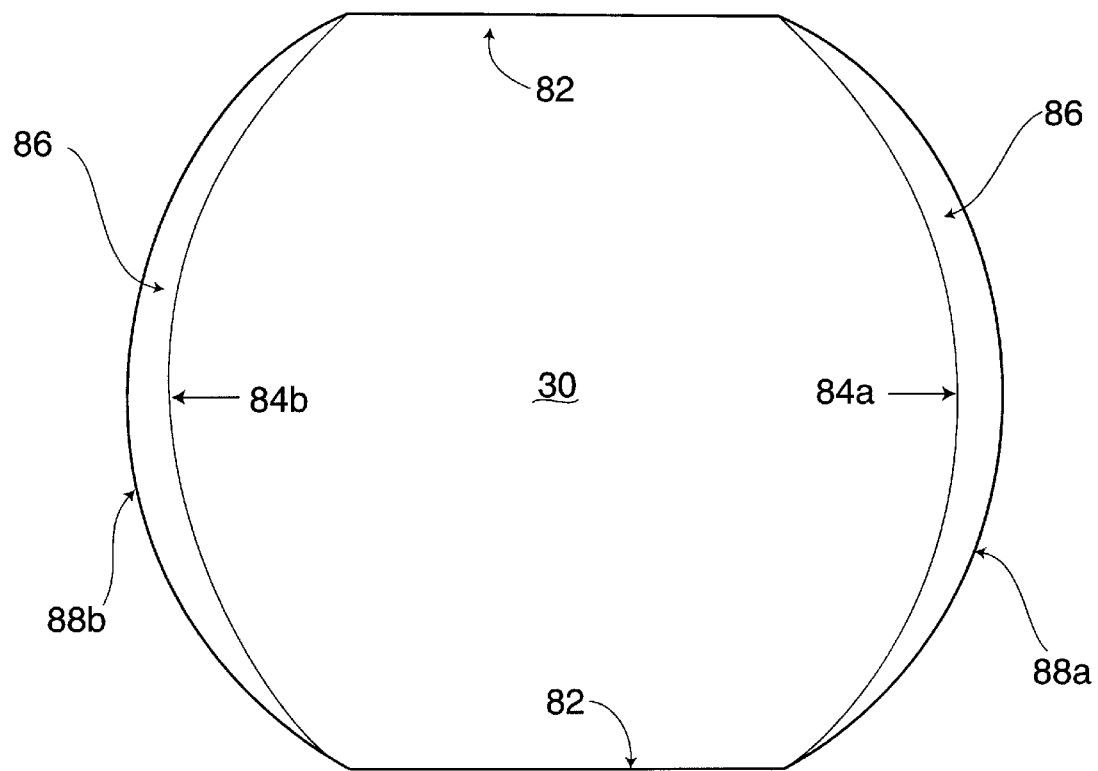
FIG. 4 illustrates a cross sectional view through section 3—3 of FIG. 2.

As mentioned above, to encourage the lateral inflation of the air bag, the air bag 20 further includes a baffle 30 that is installed downstream of the neck 24 and within the cushion 22. The purpose of the baffle is to receive and divert the inflation gas flow and to inhibit most if not all of the gas flow from flowing directly (axially) outwardly (toward the occupant). As will be seen, the baffle diminishes the rate at which gas is allowed to enter the cushion portion 22 of the air bag, thereby decreasing the initial velocity with which the air bag deploys and consequently decreasing the amount of axial extension the air bag exhibits. The baffle deflects or reroutes the gas around itself, resulting in a cushion that deploys circumferentially or laterally. The baffle creates on initial pocket of low pressure located behind itself (downstream) which is advantageous to an out-of-position occupant. Experience has shown that the low-pressure pocket allows the cushion to deploy radially around the occupant's head and upper torso, thereby limiting injuries in these regions. Reference is briefly made to FIG. 3 which shows the details of the baffle 30. The baffle includes a first set of sides 80a and 80b. Superimposed near the ends of these sides is a respective dotted line 82a and 82b which represent the sew lines by which the baffle is sewn to the top and bottom portions of the cushion. The sew lines are also shown in FIG. 2. The baffle further includes a second set of sides 84a and 84b which, in the embodiment of FIG. 3, are radially contoured to conform with the inflated contour of the sides of the cushion. FIG. 4 illustrates the relationship between the baffle 30 and the side panels 60a and 60b of the inflated air bag 20. As can be seen, the interior surfaces 84a and 84b of the side panels of the cushion are closely spaced (the space shown by numeral 86) relative to the interior surfaces 88a and 88b of the cushion sides, defining a flow orifice 86 (on either side of the baffle) through which the inflation gas flows. As can be appreciated, the main portion of the baffle diverts the inflation gas flow laterally into the cushion, thereby causing the cushion to inflate laterally and the inflation gas to flow circumferentially about the baffle, thereby limiting the extent to which the air bag can deploy in a direction toward the occupant.

In the preferred embodiment of the invention, the size of the baffle 30 from the seam 82a to the seam 82b is chosen such that in the inflated condition of the air bag, as illustrated in either FIGS. 1 or 2, the baffle, in conjunction with portions of the cushion, permits a displacement of about 18 percent (18%) of the total fore/aft length of the cushion. The optimal location of the baffle relative to the cushion inlet portion is dependent on the vehicle environment. However, as a rule of thumb, the baffle should be positioned (in proportion to the geometry of the sides of the air bag) at the point of excursion where circumferential deployment is desired.

Figure 5:
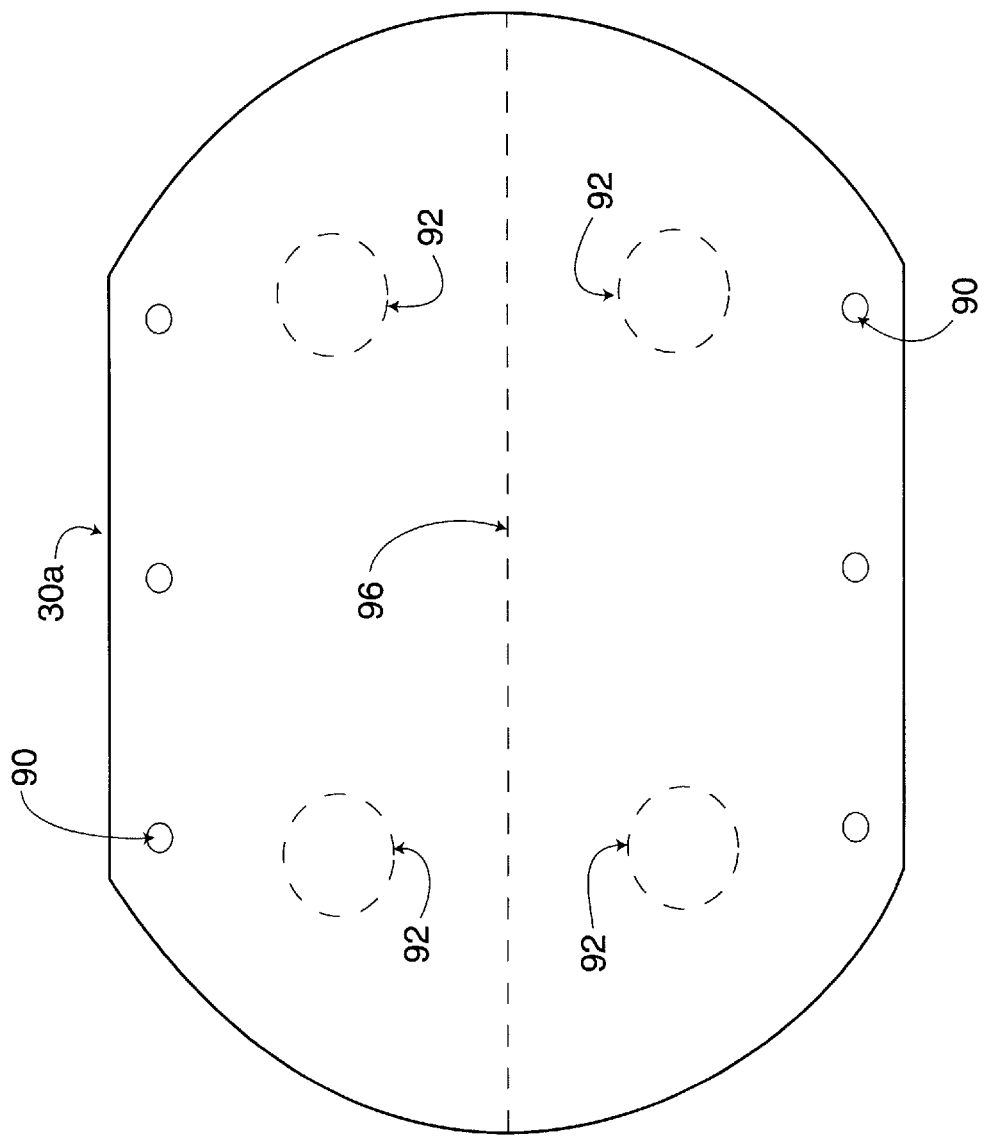
FIG. 5 illustrates alternate embodiments of the baffle that may be used in the present invention.

It is not necessary to sew the baffle to the cushion and/or inlet. Firstly, if it is not apparent from the above, the way the inflator is communicated to the air bag is not material to the basic invention. However, if the inflator 26 (or its manifold) contains the mounting studs such as 66a–66c the baffle can be attached to the studs rather than to the cushion. FIG. 5 shows an alternative construction of a baffle 30a. Baffle 30a is virtually identical to baffle 30 with the exception that baffle 30a is mounted directly to the inflator (or manifold). More particularly, the baffle 30a includes mounting openings 90 which are first fitted over the mounting studs 66a–c prior to the attachment of the cushion and inlet. FIG. 5 also shows a further modification of the invention. The baffle 30a is shown with additional flow openings 92 which permit a percentage of inflation gas to flow directly across the baffle 30a (these openings could also be included in baffle 30). This added feature permits the designer of the air bag more design options to tune the performance of the air bag. In certain circumstances such as when a greater degree of cushion excursion is required (i.e. to initiate earlier occupant ridedown), it might be desirable to permit such direct flow across the baffle. "Ridedown" as used herein, refers to the situation wherein the occupant is initially in contact with the inflated air bag and continues to generally stay in contact with the air bag as it deflates.

Finally baffle 30 or 30a may also include a line of perforations 96 which permit the baffle to tear under the influence of the pressure differential created thereacross. The benefits achieved by this feature allows for the baffle to be designed to promote circumferential cushion deployment for a specified amount of time and then to rip open allowing gas to flow directly away from the inflator.

Figure 6:
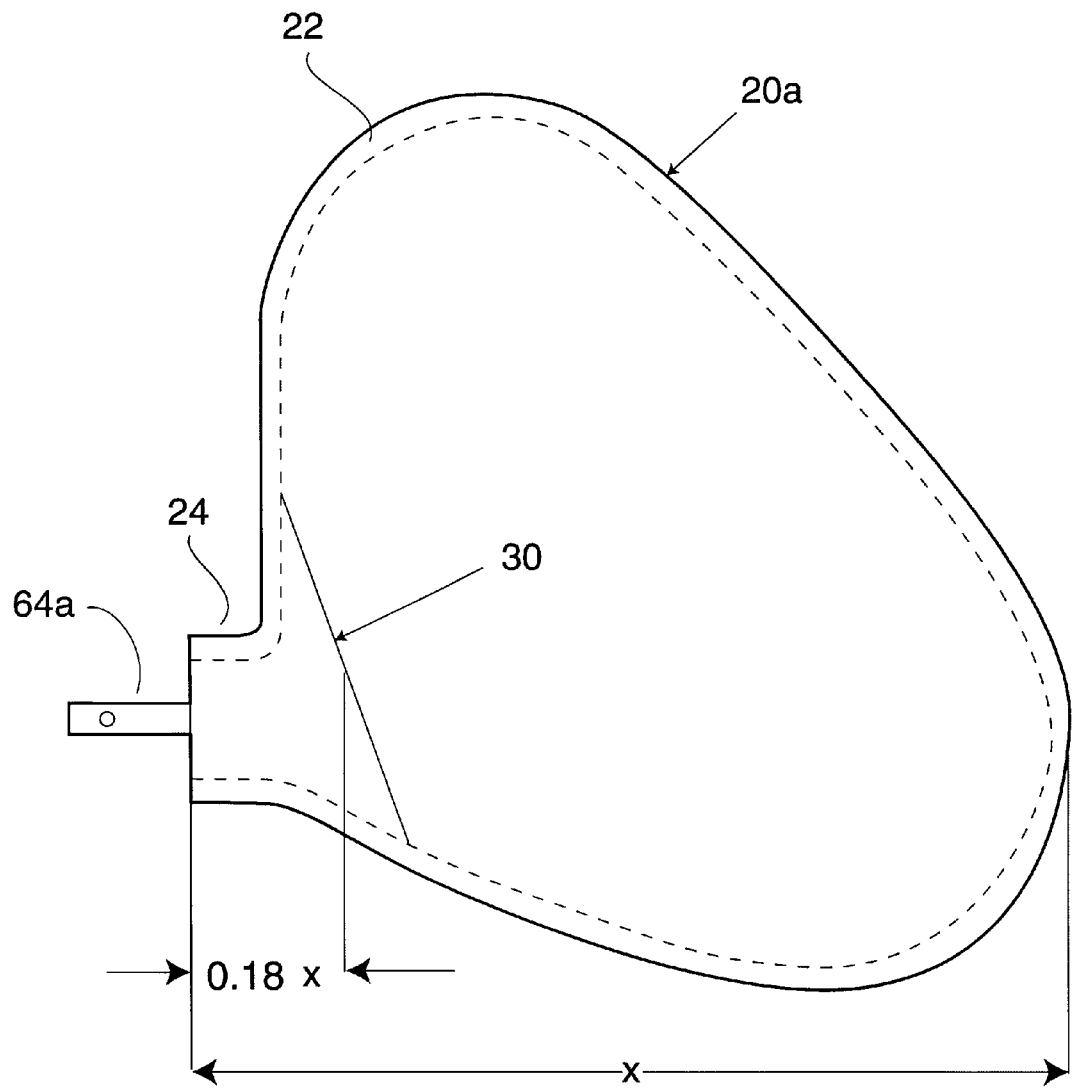
FIG. 6 illustrates a baffle orientation for a passenger side airbag application.

Reference is briefly made to FIG. 6 which illustrates the use of the present invention with an air bag 20a used to protect the occupant in side impact or rollover accidents. The construction of air bag 20a is similar to bag 20. While the dimensions of bag 20a are not shown it is substantially smaller than a bag used to protect a non-driver occupant. FIG. 6 also shows the orientation of the baffle 30 in relating to the inflated length (x) of the air bag 20a. This positioning is applicable to air bag 20.

Many changes and modifications in the above-described embodiment of the invention can, of course, be carried out without departing from the scope thereof. Accordingly, that scope is intended to be limited only by the scope of the appended claims.

What is claimed is:

1. An air bag (20) comprising:
    an inflatable cushion portion (22) and an inlet portion (24) through which inflation gas is received, and
    a baffle (30; 30a) comprising a thin, flexible, multi-sided panel, located within the cushion portion downstream of the inlet portion, the baffle including at least a first set of two generally opposed sides (80a, 80b) that are secured relative to an adjacent portion of the cushion portion and a second set of opposed sides (84a,b) loosely spaced from an adjacent corresponding inner surface of the cushion portion, for diverting at least a portion of the inflation gas to between an edge of at least one of the second set of sides and the adjacent inner surface of the cushion portion
    wherein the baffle includes a weakened region for enabling the baffle to tear.

2. The device as defined in claim 1 wherein the baffle further includes flow means (92) for encouraging a component of the inflation gas to flow directly across the baffle for causing the air bag to inflate in a direction of an occupant.

3. The device as defined in claim 2 wherein the flow means includes discrete openings (92) to permit a portion of the inflation gas to flow axially across the baffle.

4. The device as defined in claim 1 wherein each side of the first set of sides of the baffle is sewn to the cushion portion.

5. An air bag (20) comprising:
    an inflatable cushion (22) and an inlet portion (24) through which inflation gas is received, wherein the cushion is propelled by the inflation gas in a determinable direction and
    an airflow baffle means (30), located within the cushion, for causing the air bag to initially begin to inflate sideways relative to the determinable direction;
    wherein the baffle means includes a weakened region for enabling the baffle means to tear.

6. The device as defined in claim 5 wherein the baffle means includes a flexible panel inserted within the cushion downstream of the inlet portion, for diverting at least a portion of the inflation gas to between an unsecured edge of the baffle means and an adjacent inner surface of the cushion.

7. The device as defined in claim 6 wherein the baffle means includes at least a first set of two generally opposed sides that are secured relative to an adjacent portion of the cushion and a second set of opposed sides spaced from the adjacent corresponding inner surface of the cushion.

8. The device as defined in claim 7 wherein each side of the first set of sides of the baffle means is sewn to the cushion.

9. The air bag as defined in claim 7 wherein each side of the second set of sides is arcuately shaped.

10. The air bag as defined in claim 9 wherein the arcuate shape of each second side generally conforms to the shape of the adjacent inner surface of the cushion.

11. The device as defined in claim 6 wherein the baffle means further includes flow means (92) for encouraging a component of the inflation gas to flow directly across the baffle means for causing the air bag to inflate in a direction of an occupant.

12. The device as defined in claim 11 wherein the flow means includes at least one opening (92) in the baffle means.

* * * * *